Sept. 5, 1944.   R. W. CANN   2,357,500

STRAINER

Filed Nov. 7, 1942

Inventor
R. W. Cann,
By McMorrow and Berman
Attorneys

Patented Sept. 5, 1944

2,357,500

UNITED STATES PATENT OFFICE 2,357,500

STRAINER

Ralph W. Cann, Cheyenne, Wyo.

Application November 7, 1942, Serial No. 464,869

2 Claims. (Cl. 210—157)

This invention relates to strainers of the characters especially adapted for dairy purposes, wherein efficiency in straining foreign matter from milk and the like is of great importance. The primary object of the invention is the provision of a device of the above stated character which will be extremely easy to cleanse and maintain in a sanitary condition and will be employed for directing milk into a container and at the same time thoroughly strain the milk of foreign matter, being constructed to check agitation of the collected foreign matter and thereby reduce to a minimum the mixing thereof with the milk as received by the device.

With these and other objects in view as will become more apparent as the description proceeds, the invention consists in certain novel features of construction, combination and arrangement of parts as will be hereinafter more fully described and claimed.

Figure 1:
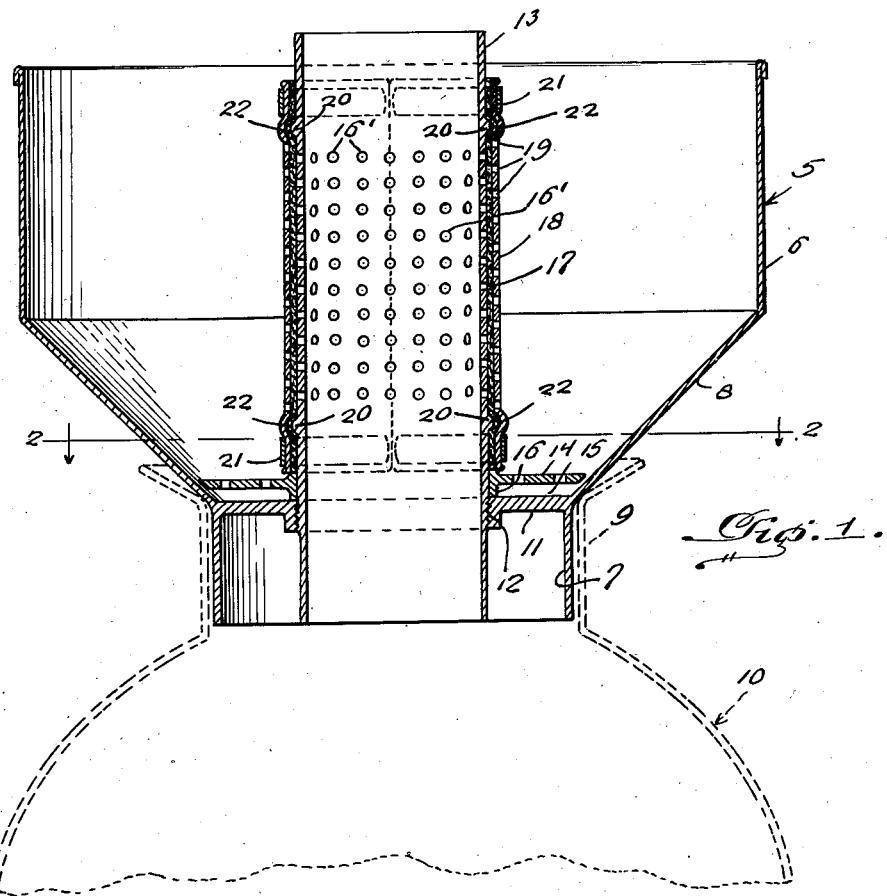

For a complete understanding of my invention, reference is to be had to the following description and accompanying drawing, in which Figure 1 is a vertical sectional view illustrating a strainer constructed in accordance with my invention, and showing the application thereof to a fragmentary part of a container.

Figure 2:
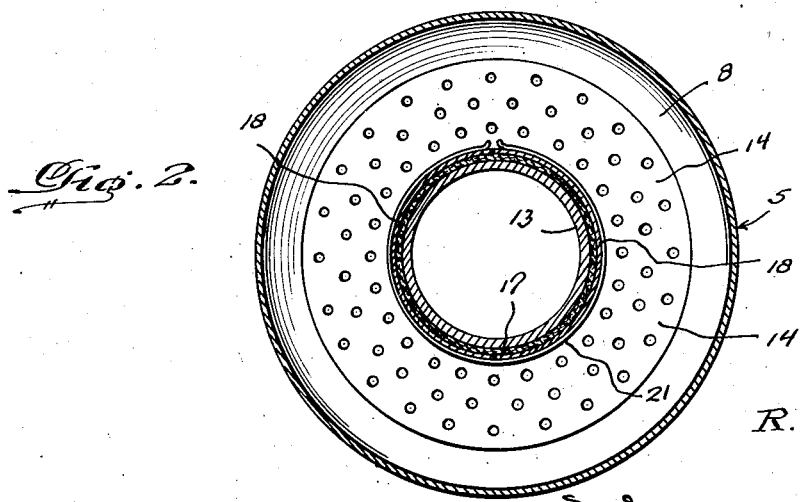

Figure 2 is a sectional view taken on the line 2—2 of Figure 1.

Referring in detail to the drawing, the numeral 5 indicates the bowl of the device including cylindrical shaped portions 6 and 7 connected by a substatnially conical-shaped portion 8. The cylindrical portions 6 and 7 are of different diameters, the cylindrical portion 7 forming the discharge neck of the device and which is adapted to be received within a neck 9 of a container 10.

It is preferable that the bowl 5 be of a seamless construction to render the cleaning thereof easier. A partition 11 is located in the bowl 5 and forms an integral part thereof, being located where the conical shaped portion forms onto the cylindrical shaped portion 7. The partition 11 is provided with a centrally arranged screw threaded opening 12 to have threaded therein a tube 13. The tube extends from the lower edge of the cylindrical portion 7 to a point above the upper edge of the cylindrical portion 6.

A perforated disc 14 is removably mounted on the tube 13 and provides a collection space 15 between itself and the partition 11, in which foreign matter may collect.

The perforated disc 14 includes a hub portion 16 which frictionally fits the tube and engages the top face of the partition 11 to space the perforated disc a proper distance from the partition 11 to form the collection space 15 of a desired size.

The tube 13 has formed therein a plurality of openings 16 covered by a filter element 17 mounted on the exterior of the tube 13. The filter element 17 is in cylindrical shape to conform to the contour of the tube 13 and may be constructed of any material suitable for the purpose. Semi-cylindrical metallic plates 18 surround the filter material and act as a protector therefor and are provided with a plurality of openings 19 arranged out of alignment with the opening 16, so that fluid passing through the openings of the plates 18 must move laterally through the filter element before entering the openings 16 of the tube 13, consequently bringing about a more efficient filtering action upon the fluid.

The tube 13 is provided with annular ribs 20 engaged by the filter element and act as stops for split resilient clamps 21 employed for securing the filter element and the semi-circular shaped plates 18 assembled on the tube 13. By forcing the split clamps 21 toward the ribs, the filter element will be bound thereagainst and within grooves 22 formed in the semi-circular shaped plates 18. The openings in the semi-circular shaped plates 18 begin at a selected distance above the perforated disc 14 so that the fluid within the bowl below the openings of the semi-circular shaped plates will be practically non-movable in circulation, consequently permitting foreign matter separated from the liquid to descend through the perforations of the disc 14 and collect in the space 15 and thereby be prevented from commingling with the liquid within the bowl in the act of passing through the filter element to the interior of the tube for discharge into the container 10.

The construction of the device described in the foregoing can be easily taken apart whereby each part of the device may be thoroughly cleansed permitting the device to be kept in a highly sanitary condition. Also, the construction permits the easy removal of the filter element and the replacement thereof or renewal by another filter element when desired.

While I have shown and described the preferred embodiment of my invention, it will be understood that minor changes in construction, combination and arrangement of parts may be made without departing from the spirit and scope of the invention as claimed.

Having described the invention, what I claim is:

1. In a strainer, a bowl including cylindrical shaped portions connected by a substantially conical shaped portion and one of said cylindrical portions being of a less diameter than the other cylindrical portions to provide a discharge neck to enter a container, a partition in said bowl and provided with a centrally located screw threaded opening, a tube threaded in said opening and extending from the lower end of the discharge neck to a point above the upper edge of the bowl and provided with openings above the partition, a filter element mounted on the tube and covering said openings, semi-circular shaped plates covering the filter element and provided with openings arranged out of alignment with the openings of said tube, said plates having grooves pressed therein providing ribs exteriorly of the plates, and split resilient clamps binding said plates, filter element and tube together with the filter element entering the grooves and being offset to enter the grooves by the ribs of the tube.

2. In a strainer, a bowl including cylindrical shaped portions connected by a substantially conical shaped portion and one of said cylindrical portions being of a less diameter than the other cylindrical portion to provide a discharge neck to enter a container, a partition in said bowl and provided with a centrally located screw threaded opening, a tube threaded in said opening and extending from the lower end of the discharge neck to a point above the upper edge of the bowl and provided with openings above the partition, a filter element mounted on the tube and covering said openings, semi-circular shaped plates covering the filter element and provided with openings arranged out of alignment with the openings of said tube, said plates having grooves pressed therein providing ribs exteriorly of the plates, split resilient clamps binding said plates, filter element and tube together with the filter element extending into the grooves and being offset by the ribs of the tube to extend into the grooves, and a perforated disc removably mounted on the tube between the lower ends of the plates and the partition and spaced from the partition to form a sediment collecting space.

RALPH W. CANN.